Sept. 23, 1952      J. AGIN      2,611,806
TESTING DEVICE FOR VOLTAGE AND CURRENT REGULATORS
Filed Feb. 25, 1949      3 Sheets-Sheet 1
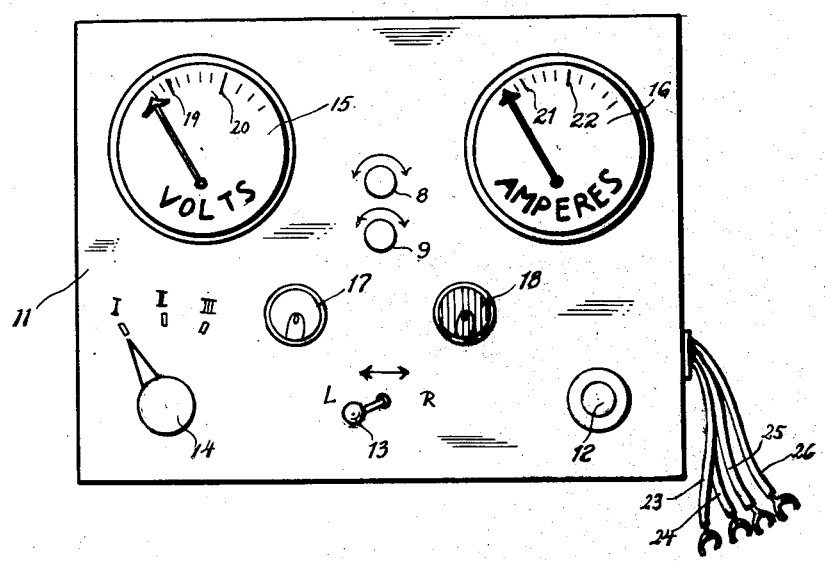
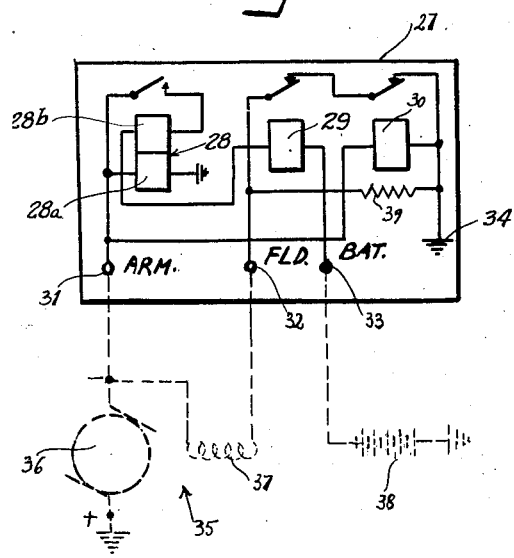
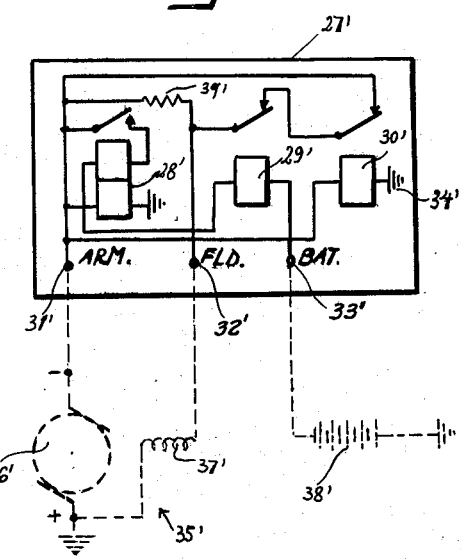
INVENTOR.
JULIUS AGIN
BY Karl F. Ross
AGENT Sept. 23, 1952   J. AGIN   2,611,806
TESTING DEVICE FOR VOLTAGE AND CURRENT REGULATORS
Filed Feb. 25, 1949   3 Sheets-Sheet 2

INVENTOR.
JULIUS AGIN
BY Karl F. Ross
AGENT

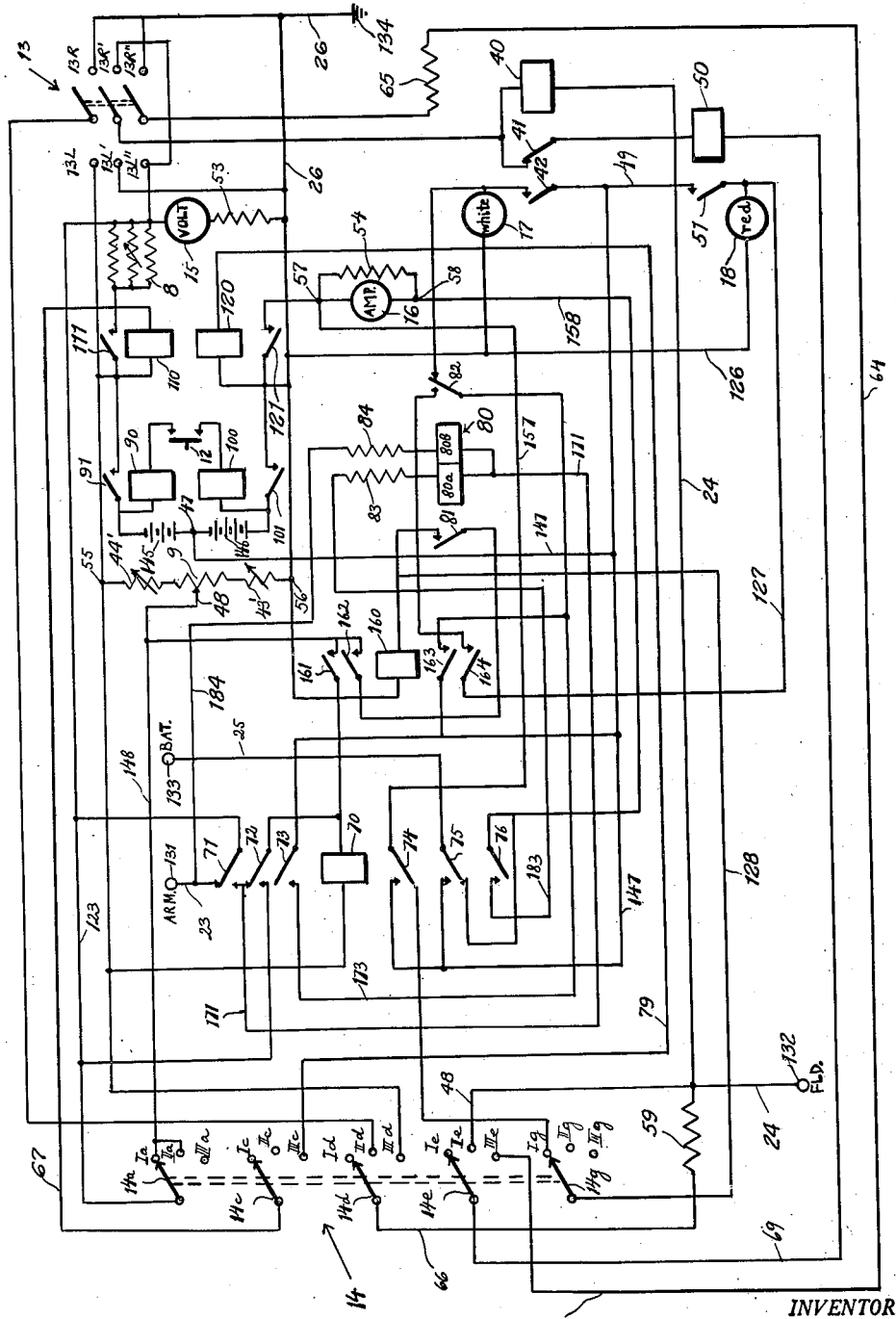

Patented Sept. 23, 1952

2,611,806

UNITED STATES PATENT OFFICE 2,611,806

TESTING DEVICE FOR VOLTAGE AND CURRENT REGULATORS

Julius Agin, Bergenfield, N. J., assignor to Patterson O. Stewart, Bronxville, N. Y.

Application February 25, 1949, Serial No. 78,361

18 Claims. (Cl. 175—183)

1

The present invention relates to testing devices for voltage and current regulators, particularly for the regulators generally employed in the electric power systems of automobile engines and the like.

Devices are known for testing the operation of a regulator of this type by testing the performance of the electric system in which the regulator is connected. These known devices, however, are incapable of being used for testing a regulator independently of the system, as when the regulator is on the shelf of a dealer.

It is, therefore, the general object of my invention to provide a testing device having means for testing the operation of a regulator disconnected from any external electrical system.

Another object of the present invention is to provide, in a testing device, means for determining the cut-in voltage, the cut-out reverse current, the maximum voltage and the maximum current of a conventional regulator.

A further object of this invention is to provide, in a testing device of the character described, means adapting said device for use with different types of conventional regulators.

Still another object of the invention is to provide, in a testing device of this character, means for indicating insufficient contact between the contact points of the regulator due, for example, to the presence of contaminating matter.

Yet a further object of the instant invention is to provide a simple, dependable and portable device incorporating some or all of the features set forth above.

The foregoing and other objects and features of the invention will become apparent from the following description of certain embodiments thereof, reference being had to the accompanying drawing in which:

Fig. 1 is a front view of a testing device according to the invention;

Figs. 2 and 3 are circuit diagrams showing different types of well-known regulators to which the invention is applicable;

Fig. 5 is a circuit diagram of a somewhat modified testing device according to the invention.

Figure 4:
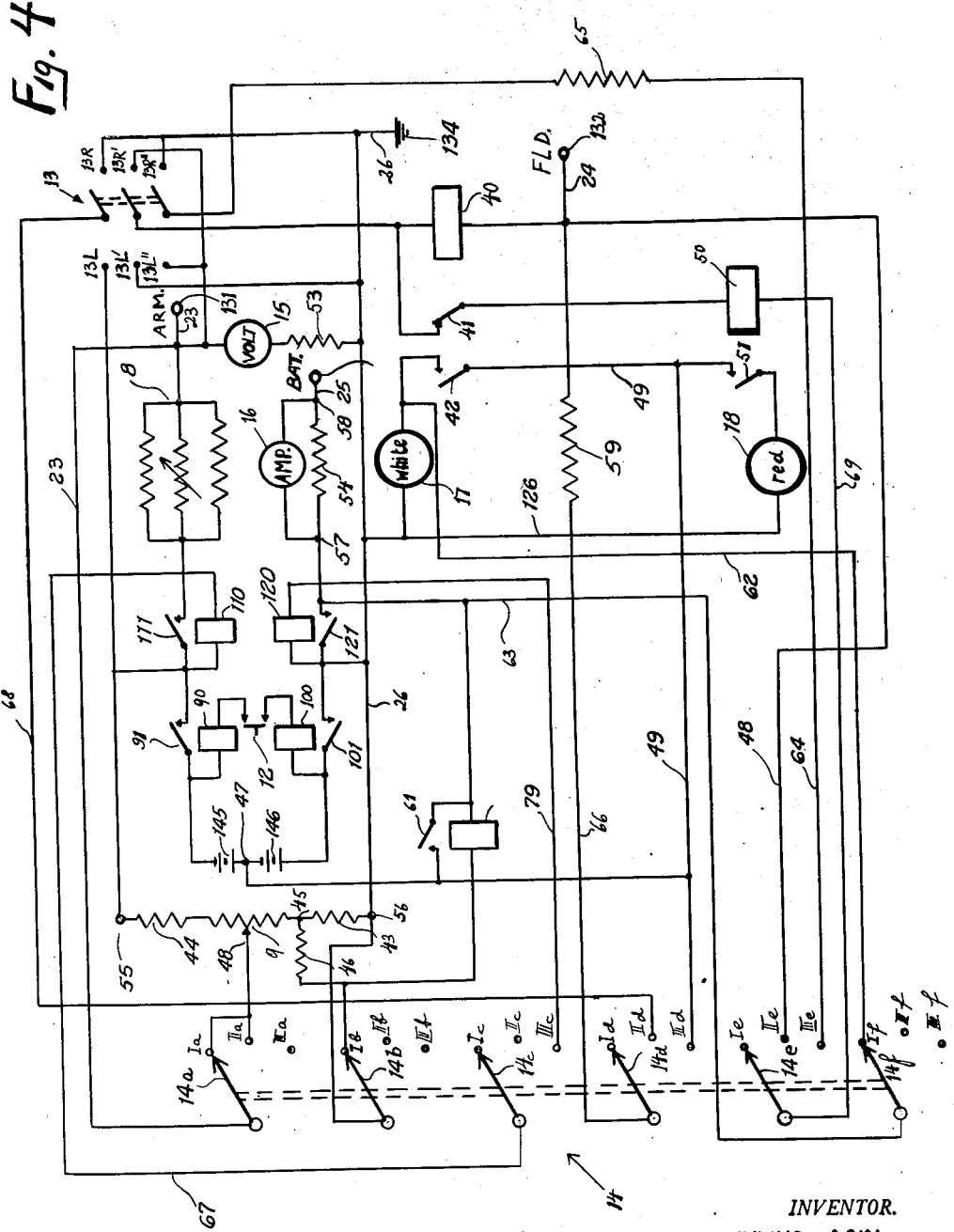
Fig. 4 is a circuit diagram of the testing device shown in Fig. 1.

Referring to Fig. 1, there is shown a testing device 10 comprising a casing 11 the front part of which carries a plurality of manual control and indicator means. The manual control means include a rotatable knob 8, a similar knob 9, a pushbutton 12, a two-position switch 13 selectively adapting the device for use with one or the other type of regulators subsequently described, the positions of this switch being indicated at L and R, and a sequence switch 14 having three positions I, II and III. The indicator means include the dials and pointers of a voltmeter 15 and of

2 an ammeter 16, a white lamp 17 and a red lamp 18. The voltmeter dial carries a mark 19, indicating normal cut-in voltage, and a mark 20, indicating normal maximum voltage; the ammeter dial carries a mark 21, indicating normal reverse-current cut-out amperage, and a mark 22, indicating normal maximum current. An armature wire 23, a field wire 24, a battery wire 25 and a ground wire 26 extend from the casing 11.

Before proceeding with the description of the operation of the device 10, it will be well to recall the functioning of a conventional voltage and current regulator used in automotive generator systems. Two such generator systems are in concurrent use: In the first, the field winding is permanently connected to the ungrounded terminal of the armature of the generator; in the second, it is so connected to the grounded terminal thereof.

Referring to Fig. 2, there is shown a regulator 27 adapted for use with a generator system of the first type, the generator system being shown in dotted lines. Regulator 27 comprises a cut-in relay 28, a current limiting relay 29 and a voltage limiting relay 30. Relay 28 has a high-resistance winding 28a and a low-resistance winding 28b. The regulator is also provided with an armature terminal 31, a field terminal 32 and a battery terminal 33, as well as with a ground indicated at 34. A resistor 39 shunts the armatures of relays 29 and 30.

The generator system served by the regulator 27 comprises a generator 35, having an armature 36 and a field winding 37, and a storage battery 38. In operation the armature 36 is connected between ground and terminal 31 of the regulator, the winding 37 is connected between terminal 32 and the ungrounded armature brush, and the battery 38 is connected between terminal 33 and ground.

At the start, i. e. when the generator 35 begins to rotate, its residual field magnetism produces an output voltage at the armature terminals which intensifies the field, thereby in turn increasing the generator output. When the cut-in voltage of the regulator is reached, relay 28 operates via its high-resistance winding 28a and closes its contacts, thereby completing a further energizing circuit for itself from terminal 31, low-resistance winding 28b, relay 29, terminal 33, battery 38 to ground. If the battery voltage is lower than the generator voltage, current flows through the winding 28b in such a sense as to reinforce the action of winding 28a; if this current becomes too large, relay 29 operates and reduces the field current of generator 35, whereas, if the voltage exceeds a predetermined maximum, relay 30 operates in parallel with winding 28a with a similar result. Should, however, the voltage of battery 38 exceed the generator voltage, current flows through the winding 28b in the opposite sense, thus restoring this relay to normal and opening its contacts, thereby disconnecting the battery from the generator, as soon as this reverse current reaches a certain magnitude.

Fig. 3 shows a regulator 27' which is generally similar to regulator 27, comprising a cut-in relay 28', a current limiting relay 29' and a voltage limiting relay 30', as well as armature, field and battery terminals 31', 32', 33', a ground 34', and a shunt resistor 39'. The associated power system comprises a generator 35', with armature 36' and field winding 37', and a battery 38'. Winding 37' is connected between ground and field terminal 32' of the regulator, its energizing circuit being completed over back contacts of relays 29', 30', armature terminal 31' and armature 36'. The operation of this regulator is completely analogous to that of regulator 27 shown in Fig. 2.

Turning now to the operation of the testing device 10, it will be seen that the circuit of Fig. 4 includes the control elements 8, 9, 12, 13 and 14, the indicators 15, 16, 17 and 18, and the conductors 23, 24, 25 and 26 illustrated in Fig. 1. Conductor 23 leads to an armature terminal 131, conductor 25 to a field terminal 132, and conductor 25 to a battery terminal 133, conductor 26 being grounded at 134. It will be understood that, in operation, terminals 131, 132 and 133 are connected to terminals 31, 32 and 33, respectively, of a regulator 27 (Fig. 2), or to the corresponding terminals 31', 32' and 33' of a regulator 27' (Fig. 3).

Fig. 4 shows the three-position switch 14 as a multi-bank switch having six contact arms 14a, 14b, 14c, 14d, 14e and 14f, each cooperating with three bank contacts representing positions I, II and III. Contacts Ia and IIa of the first bank are connected in parallel to the wiper 48 of a potentiometer representing the control element 9; the lower terminal 45 of this potentiometer is connected, through a resistor 43, to ground 134 via conductor 26, the upper potentiometer terminal being connected through a resistor 44 to contact 13L of the two-position switch 13 which is shown as a double-throw, triple-pole switch. Contact Ib is connected to the junction 45 between resistance elements 9 and 43 by way of a resistor 46, and in parallel thereto, through a relay 60, to battery terminal 133 via conductor 25 and ammeter 16 shunted by a resistance 54. Contact IIIc is connected by a lead 79 to the winding of a relay 120, a companion relay 110 thereof being connected via a lead 67 to the wiper 14c. Contact IId is connected, over a lead 68, to the upper one of the three armatures of switch 13. Contact IIId is connected to a conductor 49 which in turn is connected to the electrical mid-point 47 of a source of direct current, shown here as a pair of batteries 145, 146. Contact IIe is connected via a conductor 48 to the winding of a relay 40 and, thence, to the center armature of switch 13. Contact IIIe is connected to the lower armature of switch 13 by way of a conductor 64 and a resistor 65. Contact If is connected to grounded conductor 26 by way of a conductor 62 and white lamp 17.

Swith arm 14a is connected to conductor 23 and armature terminal 131 by way of lead 23. Switch arm 14b is connected to the lower terminal 56 of the series resistors 43, 9, 44, and to ground at 134 by way of conductor 26. Switch arm 14d is connected through a lead 66 and a resistor 59 to field terminal 132 and also to conductor 48. Switch arm 14e is connected via a lead 69 to the winding of a relay 50 and, thence, to the center armature of switch 13 by way of a tongue and back contact 41 of relay 40. Switch arm 14f is connected to ammeter terminal 57 and to the winding of relay 60 by way of a conductor 63.

The relay 40 has another tongue and front contact 42 connecting the conductor 49 to ground at 134 by way of the white lamp 17. Relay 50 similarly connects, over a tongue 51 and a front contact, the red lamp 18 between ground at 134 and conductor 49.

Push-button 12, when actuated, connects a pair of relays 90, 100 across the batteries 145, 146. Tongues and front contacts 101, 121 of relays 100 and 120 are in series, connecting the lower (positive) terminal of battery 146 to terminal 133 through ammeter 16. Tongues and front contacts 91, 111 of relays 90 and 110 are likewise in series, connecting the upper (negative) terminal of battery 145 to terminal 131 through a rheostat representing the control element 8. Terminal 131 is connected to ground at 134 by way of voltmeter 15 in series with a resistance 53.

The upper right-hand contact 13R of switch 13 as well as the lower right-hand contact 13R" are grounded via conductor 26. Center right-hand contact 13R' and lower left-hand contact 13L" are connected to terminal 131 via lead 23. Center left-hand contact 13L' is likewise grounded by way of lead 26. Upper left-hand contact 13L, connected to upper resistance terminal 55, is also connected, via contacts 91 of relay 90, to the negative terminal of battery 145.

The connections of switch 13, described above, are such that in its left-hand position the apparatus 10 will be adapted to test a regulator of the type shown in Fig. 2, while in the right-hand position of the switch 13 a regulator of the type shown in Fig. 3 may be tested. Both operations being analogous, it shall be assumed in the following that the switch is in its left-hand position and that regulator 27 of Fig. 2 is connected to the apparatus in the manner previously set forth.

For the first test, determining the cut-in voltage of the regulator, switch 14 is in position I. When the push-button 12 is depressed, relays 90 and 100 operate, closing their respective contacts 91, 101. The resistance chain 43, 9, 44 is now connected across the batteries 145, 146, and arm 14a applies to the voltmeter 15 a negative voltage which simulates the voltage from the armature 36 of a generator 35. When this voltage reaches a value sufficient to energize relay 28, upon suitable adjustment of the element 9, relay 28 closes its contacts, thereby completing a low-resistance connection between terminals 31, 131 on one hand and terminals 33, 133 on the other. It will be noted that, in position I of switch 14, resistor 46 is connected in parallel with resistor 43, thereby reducing the potential of the potentiometer wiper 48.

Relay 60 operates in a circuit from ground, arm 14b, conductor 63, ammeter 16, terminals 133, 131 switch arm 14a to potential, and locks at contacts 61 to switch arm 14b. Upon closure of contacts 61, terminals 131, 133 form, in effect, diagonally opposite junction points of a bridge circuit whose arms are the upper and lower portions of resistance chain 43, 9, 44 (separated by wiper 48) and the batteries 145, 146, owing to the negligible resistance of elements 16, 54 connecting terminal 133 to junction 47. A circuit is thus closed for the ammeter 16 the pointer of which is deflected, the instant of deflection indicating the cutting-in of the regulator. The cut-in is more clearly marked by a lighting of white lamp 17 which is energized in parallel with relay 60 via switch arm 14f. The reading of voltmeter 15 at this instant should correspond to the mark 19 if the regulator is satisfactory.

The voltage applied between terminals 131, 133 is substantially equal in sign and magnitude to the potential difference between the wiper 48 of potentiometer 9 and the junction point 47. At the moment of cut-in, this potential difference will generally be of negative polarity, thus corresponding to the case of the generator output being greater than the voltage of battery 33. Knob 9 (Fig. 1) is now rotated backwards (corresponding to a downward movement of the wiper 48 in Fig. 4) until the current through ammeter 16 and windings 28b, 29 of the regulator reverses. When this current is sufficiently large, relay 28 releases as previously described; the pointer of ammeter 16 thus returns to neutral, immediately after having reached an extreme reading which should correspond to the mark 21 in Fig. 1.

The sequence switch 14 is now rotated into position II. In this position the aforedescribed circuits for relay 60 and lamp 17 are broken at the arms 14b, 14f, respectively, the relay 60 being unable to hold up in series with resistors 43, 46. The voltage tapped off at the potentiometer 9 is still applied to the voltmeter 15, as well as to armature terminals 131, 31, this voltage having been increased by the removal of shunt resistor 46. Relay 28 operates as before, and the rotation of knob 9 is now continued in a forward direction (corresponding to an upward movement of the wiper 48 in Fig. 4) until the relay 30 operates, opening its back contacts. It will be noted that relay 40 is connected between field terminal 132 and ground, over contact 13L' of switch 13, and that switch arm 14d in position II connects terminal 132 to the high-potential (negative) side of the current source 145, 146 via contacts 91 of relay 90, switch contact 13L and resistor 59. Normally, the field terminal 32 of the regulator 27 will be grounded via back contacts of relays 29 and 30, so that the voltage drop across relay 40 will be substantially zero and relay 40 will remain unoperated. As soon, however, as relay 30 opens its contacts, relay 40 operates, lighting white lamp 17 via contacts 42 and lead 49. At this instant the reading of voltmeter 15 gives the maximum or operating voltage of the regulator and should correspond to the mark 20.

It is, however, possible that dirt or other causes prevent the contacts of relay 29 and/or 30 from completely closing the circuit between terminal 32 and ground 34 of the regulator. In this event a certain voltage drop will exist between terminal 132 and ground, long before the operation of potentiometer 9 has caused relay 30 to operate. This voltage drop will be insufficient to energize relay 40, which has a high operating voltage, but will be adequate to energize low-voltage relay 50 connected in parallel with relay 40 over back contacts 41 of the latter. Operation of relay 50 lights the red lamp 18, indicating imperfect contact at relay 29 or 30 of the regulator. Relay 50 may be slightly slow-operating, as shown, in order to give relay 40 time to break its circuit in the normal functioning of the regulator.

For the final test the switch 14 is moved into position III. In this position the relays 110, 120 are energized via switch arm 14c and leads 67, 69, closing contacts 111 and 121. Batteries 145, 146 are now connected between terminals 131 and 133 by way of ammeter 16, with its shunt resistance 54, and rheostat 8. The current now flowing through the ammeter is of such polarity as to maintain the relay 28 operated after the same has been energized over its high-resistance winding 28a. This current also passes through relay 29; when its magnitude has reached a sufficiently high value, after suitable manipulation of the rheostat 8, relay 29 operates, energizing the relay 40 and lighting white lamp 17 as in the previous test. The reading of ammeter 16 gives the maximum or operating current of the regulator and should correspond to the mark 22.

In position III of switch 14 the relay 50, associated with red lamp 18, is connected across terminals 131, 133 in parallel with the regulator circuit which includes the front contacts of relay 28. This circuit for relay 50 may be traced from terminal 131 via lead 23, lower left-hand switch contact 13L'', resistor 65, lead 64, switch contact IIIe, switch arm 14e, back contacts 41, center left-hand switch contact 13L', contacts 121, low-resistance ammeter circuit 16, 54, lead 25 to terminal 133. This time imperfect contact at relay 28 will cause the operation of relay 50, thereby lighting the red lamp 18.

Resistor 65 serves to cut down the sensitivity of relay 50 for the last-mentioned test. This is desirable because of the presence of a certain amount of impedance in parallel with the winding of relay 50, formed by windings 28b, 29 and the ammeter circuit in series, and also because the degree of conductivity at the contacts of relay 28 is less critical than at those of relays 29 and 30.

It will thus be seen that the lighting of alarm lamp 18 in position II or III of switch 14 indicates imperfect contact at either or both of the relays 29, 30 or at relay 28, respectively.

In the modification of Fig. 5, all circuit elements corresponding to similar elements in Fig. 4 have been indicated by the same reference numerals.

Switch 15 in Fig. 5 has five banks 14a, 14c, 14d, 14e and 14g. The connections of banks 14c, 14d and 14e are identical with those of Fig. 4, except that contact IIId is shown connected to high-voltage terminal 55 in lieu of junction 47. Relay 60 of Fig. 4 has been replaced by three relays 70, 80 and 160, relay 80 having two windings 80a, 80b.

Switch arm 14a is connected to voltmeter 15 by way of a conductor 123 and to armature terminal 131 over a back contact and tongue 71 of relay 70. Contacts Ia and IIa are connected, via a conductor 148, to potentiometer wiper 48 as in the previous embodiment.

Switch arm 14g is connected through a conductor 128, a tongue and front contact 81 of relay 80, and the winding of relay 160 to ground lead 26. Contact Ig is connected over a back contact and tongue 74 of relay 70 and a conductor 157 to ammeter terminal 57 which latter, in turn, is connectable to ground lead 26 by contacts 121, as in Fig. 4. The other ammeter terminal, 58, which in Fig. 4 is directly connected to battery terminal 133, is connected to the same terminal in Fig. 5 through the intermediary of a lead 158 and a back contact and tongue 75 of relay 70, lead 158 being also connected to tongue 76 of that relay. The front contacts of tongues 74, 75 of relay 70 are connected by lead 147 to junction 47 and also to conductor 49 which connects the tongue 42 to the front contact of tongue 51. Conductor 183 leads from the front contact of tongue 76 to winding 80a by way of a resistor 83, winding 80b being connected through a conductor 184 and a resistor 84 to armature terminal 131. The energizing circuits for both of these windings include a common lead 171 connected to the front contact of tongue 71. A conductor 173 connects the front contact of a tongue 73 of relay 70 to a tongue 82 of relay 80, the latter having a back contact connected directly to one side of white lamp 17 and to one side of red lamp 18 by way of front contacts and tongues 42, 51 of relays 40 and 50. The other sides of these two lamps are grounded, as in Fig. 4, through a conductor 126. A lead 127 connects tongue 51 to a tongue 164 of relay 160, the latter having a front contact connected to the front contact of tongue 82.

Adjustable resistors 43', 44' take the place of resistors 43, 44 in Fig. 4, thereby dispensing with the need for an auxiliary resistor 46 controlled by a separate switch arm 14b.

The circuit arrangement of Fig. 5 is designed to energize the white lamp 17 in position I of switch 14 in such a way that lighting of that lamp will indicate the cut-in of the regulator, as in the previous embodiment, whereas extinction of the lamp 17 will indicate the moment of reverse-current cut-out. With this arrangement, the pointer of ammeter 16 remains deflected so that the magnitude of the cut-off current can be conveniently determined.

Another advantage of the arrangement of Fig. 5 is that any irregularity in the path interconnecting the armature and battery terminals of the regulator, whether the impedance of this path be too high or too low, will be indicated by the lighting of red lamp 18 in lieu of white lamp 17.

The testing device illustrated in Fig. 5 operates as follows:

When the potential difference between the potentiometer wiper 48 and grounded terminal 56 has reached such a value as to cause the regulator relay 23 to operate, relay 160 is energized in a circuit which extends from ground at 56 over the winding of relay 160, lead 128, switch arm 14g in position I, back contact and tongue 74, lead 157, ammeter terminal 57, ammeter 16, ammeter terminal 58, lead 158, back contact and tongue 75, battery terminal 133, the internal circuit of the regulator, armature terminal 131, lead 123, switch arm Ia in position I, lead 148 to potential at wiper 48. Relay 160 closes a circuit for white lamp 17 extending from ground at 56 over leads 26, 126, lamp 17, back contact and tongue 82, front contact and tongue 163, conductor 147 to potential at junction 47. Relay 160 also closes an energizing circuit for relay 70 extending from negative high-voltage terminal 55 over the winding of relay 70 and tongue 161 of relay 160 to the wiper 48.

The operating voltage of relay 70 is such that this relay will not attract its tongues as long as the potential of wiper 48 corresponds to that at which the regulator normally operates (and which should be more negative than that of junction 47). After the potentiometer has been displaced to a certain extent in the reverse direction (wiper 48 moving downwards in the diagram), the voltage drop across the winding of relay 70 has been increased sufficiently to cause this relay to function; at this point, however, wiper 48 should still be negative with respect to point 47. Relay 70 in operating opens the previously traced energizing circuit for relay 160 (which, however, is slightly slow-releasing, as indicated) and closes the two energizing circuits for windings 80a and 80b. The first of these circuits extends from wiper 48 over arm 14a, tongue and front contact 71, conductor 171, winding 80a, resistor 83, lead 183, front contact and tongue 76, lead 158, ammeter 16, conductor 157, tongue and front contact 74, conductor 147 to point 47; the second extends from conductor 171 over winding 80b, resistor 84 and lead 184, terminal 131, internal circuit of the regulator, terminal 133, lead 25, tongue and front contact 75, conductor 147 to point 47. It will be seen that both windings of the relay 80 are thus connected in the diagonal 47, 48 of the measuring bridge, winding 80a being connected in series with resistor 83 and the ammeter 16, winding 80b being connected in series with resistor 84 and the regulator.

The windings 80a, 80b are differentially wound so that the relay 80 will not operate if current of the same magnitude flows through both of the aforedescribed circuits. Resistors 83, 84 are selected so that the resistances of both of these circuits will be the same if the internal circuit of the regulator between the battery terminal and the armature terminal thereof offers a normal impedance to the passage of current; in this event relay 160 will release without relay 80 having operated. White lamp 17, however, remains lit over an alternative circuit which extends from tongue 82 over front contact and tongue 73 to point 47. Relay 70 has locked to arm 14a over its own tongue 72.

As soon as wiper 48 goes positive with respect to point 47, reverse current flows through both windings of relay 80 and eventually breaks the internal circuit of the regulator. When this occurs, relay 80 becomes unbalanced and attracts its tongues 81, 82, thereby breaking the circuit for lamp 17 at tongue 82. The circuit for ammeter 16 remains, however, unaffected and the reverse cut-out current may be read thereon.

Should, however, the internal resistance of the regulator have been inordinarily high or low, relay 80 would have operated after relay 70 and would have prevented the release of relay 160 by closing a holding circuit therefor over its own tongue and front contact 81 as well as tongue and front contact 162 of relay 160. At the same time the circuit of white lamp 17 would have been broken at tongue 82 and a circuit closed for red lamp 18 over tongue and front contact 164, front contact and tongue 82, and front contact and tongue 163. It will further be apparent that, if desired, one of the resistors 83, 84 may be made variable for the purpose of rebalancing, in such an event, the relay 80 so as to extinguish the red lamp and re-light the white one, whereupon the reverse current cut-out test can be carried out as previously set forth. It will also be noted that an increase in the magnitude of resistors 83, 84 will diminish the sensitivity of relay 80.

The tests to be carried out in positions II and III of switch 14 are essentially unaffected by the modification of Fig. 5 and will, therefore, not be described again. It can be seen that relay 160 can be energized in position I only and that, with relays 160 and 70 unoperated, armature terminal 131 is connected to switch arm 14a and to the voltmeter 15 via tongue 71 while battery terminal 133 is connected to ammeter terminal 58 via tongue 75, thus effectively producing the conditions of Fig. 4.

While the invention has been described with reference to certain specific embodiments, it is to be understood that the same have been given merely by way of illustration and not as a limitation upon the scope of the invention, the latter on the contrary being capable of numerous modifications and adaptations; for example, the meters 15 and 16 could obviously be replaced by suitable calibrations at the control knobs 8 and 9. Many other changes will be readily apparent to those skilled in the art, it being intended that all such changes, adaptations and modifications be embraced within the scope of the invention as defined in the objects and in the appended claims.

I claim:

1. A device for testing a voltage and current regulator of the type having at least three external connections, comprising a first, a second and a third terminal respectively connectable to said three external connections, a source of electrical energy, first circuit means connecting said source in an energizing circuit across one combination of two of the said terminals, control means in said energizing circuit for varying the output of said source, current responsive indicator means, a source of current, second circuit means connecting said indicator means and said source of current in a control circuit across another combination of two of the said terminals, said indicator means being adapted to detect a substantial change in the output of said source of current, due to a change in the impedance of said control circuit, and to give a signal upon such change of impedance, and measuring means connected to said control means for determining the magnitude of the output of said source of electrical energy at the instant of said signal.

2. A device for testing a voltage and current regulator of the type having external connections including an armature connection, a field connection, a battery connection and a grounded connection, comprising a first, a second and a third terminal respectively connectable to said armature, field and battery connections and further provided with a grounded fourth terminal, a source of electrical energy, switch means for selectively connecting said source in a plurality of energizing circuits across certain combinations of two of the said terminals, control means in said energizing circuits for varying the output of said source, current responsive indicator means, a source of current, circuit means connecting said indicator means and said source of current in at least one control circuit across another pair of the said terminals, said indicator means being adapted to detect a substantial change in the output of said source of current, due to a change in the impedance of said control circuit, and to give a signal upon such change of impedance, and measuring means connected to said control means for determining the magnitude of the output of said source of electrical energy at the instant of said signal.

3. A device for testing an electrical regulator of the type having a voltage-responsive cut-in relay and a pair of output connections, interconnectable by contacts of said relay, and further having input connections for the energization of said relay, comprising a source of variable voltage, first circuit means for connecting said source across said input connections, control means for varying said voltage, voltmeter means connected across said source, current responsive indicator means, a source of current, and second circuit means for connecting said source of current and said indicator means across said output terminals, said indicator means being adapted to respond to a change in the output of said source due to the operation of said relay, thereby enabling the magnitude of said voltage at the instant of said operation to be read on said voltmeter means.

4. A device for testing an electrical regulator of the type having a cut-in relay provided with a first energizing circuit including a voltage winding of said relay and further provided with a second energizing circuit including make contacts and a current winding of said relay, comprising a source of variable voltage, first circuit means for connecting said source across said first energizing circuit, control means for varying said voltages, voltmeter means connected across said source, a source of current, second circuit means for connecting said source of current in said second energizing circuit with a polarity opposing that of said source of voltage, control means for varying the output of said source of current, ammeter means in series with said source of current, and current responsive indicator means connectable in said second energizing circuit, said indicator means being adapted to signal the appearance and disappearance, due to the closing and opening of said contacts, of a current flow in said second energizing circuit, whereby the magnitude of said voltage and of said current output at the instant of said closing and opening may be read on said voltmeter and ammeter means, respectively.

5. A device for testing an electrical regulator of the type having a relay, an energizing circuit for said relay and an operating circuit including contacts of said relay, comprising a source of electrical energy, circuit means for connecting said source across said energizing circuit, control means for applying a variable portion of said energy to said energizing circuit, current responsive indicator means and a source of current connectable in said operating circuit, said indicator means being adapted to give a signal upon detecting a change in the output of said source of current due to the operation of said contacts, and measuring means connected to said control means for determining the magnitude of said variable portion at the instant of said signal.

6. A device according to claim 5, comprising current responsive alarm means connectable in said operating circuit and adapted to respond to current from said source of current whenever the impedance of said operating circuit exceeds a predetermined value, whereby imperfect closure of said contacts results in an operation of said alarm means.

7. A device according to claim 6 for use with regulators wherein said contacts are break contacts of said relay, said indicator means comprising switch means adapted to disable said alarm means upon operation of said indicator means.

8. A testing device for electrical regulators, comprising a source of current, at least three output terminals, first circuit means applying a first portion of the output of said source across a first combination of two of said output terminals, second circuit means applying a second portion of the output of said source across a second combination of two of said output terminals to cause the flow of a current through a load connected between the last-mentioned terminals, the magnitude of said load current depending upon the impedance of the load, control means for varying the magnitude of said first portion, measuring means connected to said control means for determining said magnitude, and current responsive indicator means connected by said second circuit means to said source and between said second combination of terminals, said indicator means being adapted to detect changes in the magnitude of said load current due to changes in the impedance of an internal circuit of a regulator having terminals connected to respective ones of said output terminals, said internal circuit representing the said load.

9. A testing device according to claim 8, further comprising switching means for selecting different combinations of output terminals.

10. A testing device for electrical regulators, comprising a plurality of output terminals including an armature terminal, a field terminal and a battery terminal all connectable to corresponding input terminals of a regulator to be tested, and a ground terminal, a source of current, a potentiometer having its input connected across said source, a voltmeter, current responsive indicator means adapted to signal the flow of current therethrough, and a switch operable to connect said indicator means between said armature and battery terminals in series with at least a portion of said source and to connect the output of said potentiometer between said armature and ground terminals, said voltmeter being simultaneously connectable by said switch across the output of said potentiometer, thereby enabling the voltage at the output of said potentiometer to be read at the instant when a cut-in relay of the regulator, responsive to said voltage, interconnects the armature and battery terminals of the regulator, thus actuating said indicator means.

11. A testing device according to claim 10, comprising circuit means connecting said potentiometer and said source in a bridge circuit adapted to produce a variable current of reversible polarity, said indicator means including an ammeter connectable by said switch in series with the output of said bridge circuit between said armature and battery output terminals, whereby the magnitude of the reverse current necessary to inactivate said cut-in relay may be read on said ammeter.

12. A testing device according to claim 10, comprising current responsive alarm means connectable by said switch between said armature and battery output terminals in circuit with at least a portion of said source, said alarm means being adapted to respond to current from said source whenever the impedance externally present between said armmeter and battery output terminals exceeds a predetermined value substantially less than that at which said indicator means will remain inactive, whereby imperfect closure of the contacts of said cut-in relay may be ascertained.

13. A testing device for electrical regulators, comprising a plurality of output terminals including an armature terminal, a field terminal and a battery terminal all connectable to corresponding input terminals of a regulator to be tested, and a ground terminal, a source of current, a potentiometer, a voltmeter, an ammeter, a rheostat, a switch operable in one position to connect the input of said potentiometer across said source and the output of said potentiometer in parallel with said voltmeter across said armature and ground terminals, said switch being further operable in another position to connect said ammeter, said rheostat and said source in series across said armature and battery terminals, and current responsive indicator means connected in circuit with at least a portion of said source between said field output terminal and one of the remaining output terminals other than said battery terminal, said indicator means being adapted to signal a decrease in current from said source due to the opening of respective contacts of a voltage-responsive relay and of a current-responsive relay of a regulator, energized in said one and said other position of said switch, respectively, whereby the magitude of the output of said source effective to operate either of said relays may be read on said voltmeter and on said ammeter, respectively.

14. A testing device according to claim 13, comprising current responsive alarm means connectable by said switch, in at least one of said positions thereof, in shunt with said indicator means, said alarm means being adapted to respond to current from said source whenever the impedance externally present between said field output terminal and said one of the remaining output terminals exceeds a predetermined value substantially less than that required for the operation of said indicator means, whereby imperfect closure of the contacts of either of said relays may be ascertained.

15. A testing device according to claim 14 comprising switch means controlled by said indicator means and adapted to disable said alarm means upon operation of said indicator means.

16. A testing device according to claim 15 wherein said indicator means comprise a first relay provided with make and break contacts and first signaling means energizable over said make contacts, said alarm means including a second, more sensitive relay connected in series with said break contacts and provided with make contacts, and second signaling means energizable over the make contacts of said second relay.

17. A testing device according to claim 13, comprising an additional switch for selectively connecting said indicator means to said armature output terminal and to said ground output terminal, thereby adapting the testing device for use with different types of regulators.

18. A testing device according to claim 13, comprising relay means normally maintaining said switch inoperative and push-button means for operating said relay means to render said switch operative.

JULIUS AGIN.

REFERENCES CITED

The following references are of record in the file of this patent:

UNITED STATES PATENTS

| Number | Name | Date |
|---|---|---|
| 2,096,131 | Oestermeyer | Oct. 19, 1937 |
| 2,352,499 | Sears | June 27, 1944 |
| 2,422,873 | Wolfner | June 24, 1947 |

OTHER REFERENCES

Dyke's Automobile Encyclopedia, by A. L. Dyke, 15th Edition, Goodheart-Wilcox Co., Inc., 1928, pages 403 and 404.